No. 780,835.

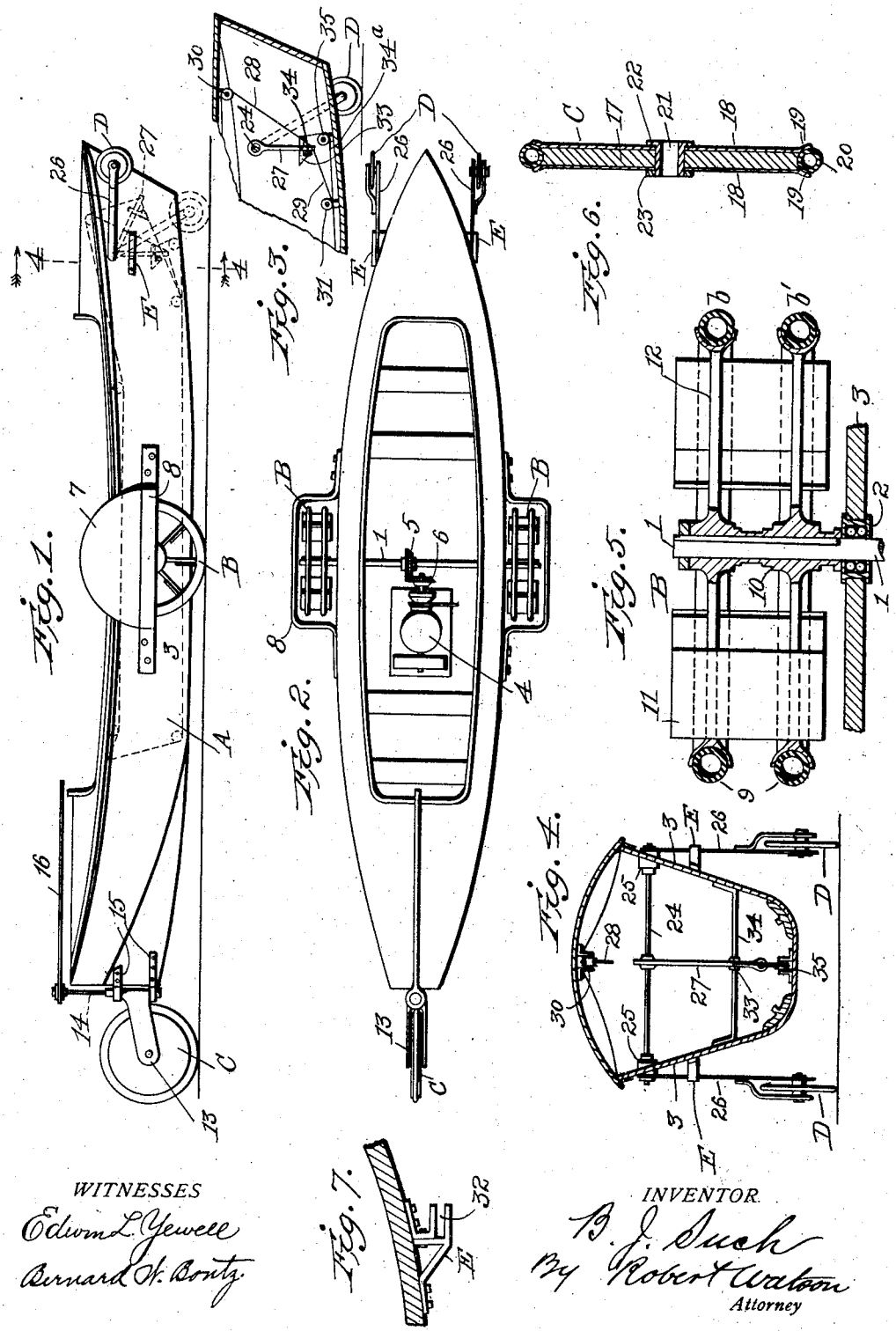

Patented January 24, 1905.

UNITED STATES PATENT OFFICE.

BENJAMIN J. SUCH, OF WASHINGTON, DISTRICT OF COLUMBIA.

SURF-BOAT.

SPECIFICATION forming part of Letters Patent No. 780,835, dated January 24, 1905.

Application filed March 3, 1904. Serial No. 196,386.

*To all whom it may concern:*

Be it known that I, BENJAMIN J. SUCH, a citizen of the United States, residing at Washington, in the District of Columbia, have invented certain new and useful Improvements in Surf-Boats, of which the following is a specification.

My invention relates to improvements in surf-boats; and the purpose of the invention is to provide a motor-propelled boat adapted to travel on land and water and which may be launched and brought ashore through a heavy surf.

In the accompanying drawings, Figure 1 is a side view of the boat. Fig. 2 is a plan view of the same with the paddle-wheel boxes removed. Fig. 3 is a central longitudinal section taken vertically through the bow of the boat. Fig. 4 is a section on the line 4 4 of Fig. 1. Fig. 5 is a section taken diametrically through one of the combined traction and paddle wheels. Fig. 6 is a sectional view taken diametrically through the combined steering-wheel and rudder, and Fig. 7 is a detail view showing one of the brackets or stops for the arms which carry the bow-wheels.

Referring to the drawings, A indicates a boat which is preferably of the form shown, but which may be a surf-boat of any suitable design. A shaft 1 extends transversely of the boat, preferably a short distance forward of the beam, and this shaft is journaled in bearings 2, suitably arranged in the sides 3 of the boat. This shaft is driven by a motor 4, which may be of any design suitable for the purpose. The shaft 1 has a bevel-gear 5 secured thereto, and this gear meshes with a gear 6 upon the motor-shaft. The motor, as shown, is placed between the shaft 1 and the stern of the boat.

A pair of combined traction and paddle wheels B are secured to the ends of the shaft 1 at the opposite sides of the boat, and each wheel is preferably housed by a paddle-wheel box 7, which rests upon a metal guard 8, secured to the side of the boat and extending around the wheel, as shown. Each combined traction and paddle wheel consists of a pair of wheels $b$ and $b'$, arranged parallel with one another and a few inches apart, and each of these wheels $b$ and $b'$ is provided with a pneumatic tire 9. Both wheels $b$ and $b'$ may have one common hub 10, as shown in Fig. 5, or they may have independent hubs, secured to the shaft 1, so that they will rotate together, both forming a single wheel having a double tread. A series of paddles 11 are secured to the spokes 12 of the wheels $b$ and $b'$. These paddles are arranged wholly within the rims of the wheels, so that they will not engage the ground. The diameters of the combined traction and paddle wheels are such that the wheels extend below the bottom of the boat, and when the latter is upon land the pneumatic tires engage the ground. These wheels serve as the main support for the boat and as traction-wheels when the boat is upon land and also as a means for propelling the boat when in the water.

The rear end of the boat is supported upon a combined steering-wheel and rudder C, which is journaled in a fork 13, said fork being secured to a steering-post 14, arranged vertically at the stern of the boat and journaled in suitable bearings 15. A tiller 16 is secured to the top of the steering-post. The wheel C extends below the bottom of the boat, so as to support the boat when upon land, and it may be turned by means of the tiller 16, so as to steer the boat either upon land or in the water. The construction of this combined steering-wheel and rudder is illustrated in Fig. 6. It preferably consists of a wooden disk 17, having metal sheathings 18 at its sides, which project slightly beyond the periphery of the disk 17 and are bent slightly outward, as indicated by the numerals 19, to form a seat for a pneumatic tire 20, which surrounds the wheel. The hub of the wheel consists of a bushing or sleeve 21, having an integral flange 22 at one end, which fits against one of the sheathings 18, and the bushing is secured in place by a nut 23, threaded upon the opposite end of the sleeve and bearing against the sheathing at the opposite side of the wheel.

A shaft 24 is arranged transversely in the bow of the boat, this shaft being journaled in suitable bearings 25 in the sides of the boat above the water-line. A pair of arms 26 are rigidly secured to the ends of the shaft 24 outside of the boat, and pneumatic-tired wheels D are suitably journaled in the free ends of these arms. The wheels D are similar in construction to the wheel C. The shaft 24 may be rocked by means of a lever 27, secured to said shaft within the boat, and the arms 26 may thus be moved from the position shown in full lines, Fig. 1, to the position indicated in dotted lines in said figure, and further illustrated in Figs. 3 and 4. The bow-wheels D may be raised and lowered at will by the helmsman by means of ropes 28 and 29, secured to the end of the lever 27 and reeved through suitably-arranged pulleys 30 and 31. When the bow-wheels are lowered, the arms 26 rest within guide-slots 32 in stops or brackets E, which latter are secured to the sides of the boat and brace the arms at the rear and the sides. When the arms are in their lowermost position and abutting against the brackets, a latch 33, pivoted to the lever 27, engages a bar 34 and locks the arms against movement in a forward or upward direction. Any suitable form of locking device may be employed; but a latch of the ordinary form shown and sufficiently heavy to cause it to rest against the bar at all times will answer the purpose. When it is desired to raise the bow-wheels, the latch may be unhooked by pulling upon a rope 34ª, secured to the forward end of the latch and reeved through suitable pulleys 35. The bow-wheels D are maintained in their upper position at all times, except when the boat is making for shore.

In traveling upon land or in launching the boat the latter is supported entirely by the wheels B and C, and after the boat is afloat the wheels B serve to propel it and the wheel C serves as a rudder. As the shaft 1 is constantly driven it will be seen that either in launching the boat or returning to shore the boat will be propelled by the traction-wheels whenever the latter engage the ground, and as soon as the boat is lifted off of the ground the boat will be propelled by the paddles. The bow-wheels can serve no useful purpose in traveling upon land or in launching the boat or while the latter is afloat, and under these conditions the wheels would interfere with steering upon land and in the water and also retard the progress of the boat if they were permanently secured in their lowermost position. For this reason under such circumstances the wheels are raised to a point above the water-line of the boat. In landing, however, the bow-wheels are lowered so that they will engage the ground and prevent the nose of the boat from running into the ground when the stern portion is raised by a wave. With the ordinary surf-boat if the nose of the boat strikes the ground its progress is stopped and the boat is thrown over by the waves and swamped. With my boat, however, the nose of the boat is prevented from engaging the ground when approaching the shore, and as the combined traction and paddle wheels are continually in operation the boat is propelled forward at all times either by the engagement of the tires with the ground or the paddle-wheels with the water, and instead of striking the ground and being thrown over by the waves the boat moves continuously toward the shore. The resilient tires upon the wheels are desirable for locomotion upon the ordinary sandy or gravel beaches; but they are particularly desirable on a boat of this character to relieve the shock which occurs when the boat is thrown upon the beach by the rising and falling of the waves.

The bow-wheels herein shown and described may be employed to advantage on an ordinary life-boat propelled by oars to prevent the nose of the boat from striking the ground in coming to shore, and I do not wish to limit this part of my invention to motor-propelled boats. The wheels at the bow may be raised and lowered by various means, and instead of employing a pair of bow-wheels a single wheel, if arranged in a central position, would answer the purpose desired, although not so perfectly as a pair of wheels arranged as shown.

Having described my invention, what I claim, and desire to secure by Letters Patent, is—

1. The combination with a boat, of a pair of arms adjustably secured at the bow of the boat, means for raising and lowering said arms, wheels journaled in said arms and adapted to extend below the bottom of the boat when the arms are lowered, brackets secured to the sides of the boat and forming stops to limit the backward movement of said arms, and means for locking said arms against forward movement when the arms are against the brackets.

2. The combination with a boat, combined paddle and traction wheels arranged at opposite sides of the boat, a motor for driving said wheels, and a combined steering-wheel and rudder arranged at the stern of the boat, of a pair of wheels arranged at the bow of the boat on opposite sides thereof and adapted to project below the bottom of the boat.

3. The combination with a boat, combined paddle and traction wheels arranged at opposite sides of the boat, a motor for driving said wheels, and a combined steering-wheel and rudder arranged at the stern of the boat, of a pair of pneumatic-tired wheels arranged at the bow of the boat on opposite sides thereof and adapted to project below the bottom of the boat.

4. The combination with a boat, combined paddle and traction wheels arranged at opposite sides of the boat, a motor for driving said wheels, and a combined steering-wheel and rudder arranged at the stern of the boat, of a pair of wheels arranged at the bow of the boat on opposite sides thereof and adapted to project below the bottom of the boat, and means for raising said wheels above the water-line.

5. The combination of a boat, combined paddle and traction wheels arranged at opposite sides of the boat, a motor for driving said wheels, a combined steering-wheel and rudder arranged at the stern of the boat, a shaft journaled transversely in the bow of the boat and projecting beyond its sides, arms secured to the ends of said shaft, wheels journaled in the free ends of said arms, brackets secured to the sides of the boat and forming stops to limit the backward movement of said arms, means for locking said arms against forward movement when the arms are against the brackets, and means for rocking said shaft.

6. The combination of a boat, combined paddle and traction wheels arranged at opposite sides of the boat, a motor for driving said wheels, a combined steering-wheel and rudder arranged at the stern of the boat, a shaft journaled transversely in the bow of the boat and projecting beyond its sides, arms secured to the ends of said shaft, wheels journaled in the free ends of said arms, brackets secured to the sides of the boat and forming stops to limit the backward movement of said arms, said brackets having slots adapted to receive the arms and prevent lateral movement thereof, and means for rocking said shaft comprising a lever secured to the shaft within the boat, and ropes or cables secured to said lever.

7. The combination of a boat, combined paddle and traction wheels arranged at opposite sides of the boat, a motor for driving said wheels, a combined steering-wheel and rudder arranged at the stern of the boat, a shaft journaled transversely in the bow of the boat and projecting beyond its sides, arms secured to the ends of said shaft, wheels journaled in the free ends of said arms, brackets secured to the sides of the boat and forming stops to limit the backward movement of said arms, a lever secured to said shaft within the boat, and means for locking said lever when said arms are against the bracket.

8. The combination of a boat, combined paddle and traction wheels arranged at opposite sides of the boat, a motor for driving said wheels, a combined steering-wheel and rudder arranged at the stern of the boat, a shaft journaled transversely in the bow of the boat and projecting beyond its sides, arms secured to the ends of said shaft, wheels journaled in the free ends of said arms, brackets secured to the sides of the boat and forming stops to limit the backward movement of said arms, a lever secured to said shaft within the boat, and means for locking said lever when said arms are against the bracket, comprising a latch pivoted to the lever and a stationary member adapted to be engaged by said latch.

9. The combination with a boat, of a shaft arranged transversely of the boat and projecting beyond its sides, a motor arranged to drive said shaft, combined traction and paddle wheels secured to the ends of the shaft, each of said wheels comprising a pair of rims, resilient tires upon said rims and paddles arranged between the rims and wheel-hubs and at sufficient radial distance from said tires to avoid coming in contact with the ground, a vertically-arranged steering-post journaled at the stern of the boat, a combined steering-wheel and rudder arranged at the lower end of said steering-post, and a pair of wheels adjustably supported at the bow of the boat and adapted to project below the nose of the boat.

In testimony whereof I affix my signature in presence of two witnesses.

BENJAMIN J. SUCH.

Witnesses:
WALLACE F. BAKER,
ELMER E. FORBES.